United States Patent

[11] 3,633,172

[72] Inventors Fritz Eggimann
Oberengstringen;
Gustav Guanella, Zurich; Manfred Tiesnes, Nussbaumen; Ivan Wigdorovits, Zurich, all of Switzerland
[21] Appl. No. 2,492
[22] Filed Jan. 13, 1970
[45] Patented Jan. 4, 1972
[73] Assignee Patelhold Patentverwertungs- & Elektro-Holding A.G.
Glarus, Switzerland
[32] Priority Jan. 15, 1969
[33] Switzerland
[31] 474/69

[54] MEANS FOR AND METHOD OF ADDRESS-CODED SIGNALING
12 Claims, 9 Drawing Figs.

[52] U.S. Cl. .......... 340/172.5
[51] Int. Cl. .......... H03k 7/00
[50] Field of Search .......... 340/172.5

[56] References Cited
UNITED STATES PATENTS
3,299,411 1/1967 Capozzi et al. .......... 340/172.5
3,310,786 3/1967 Rinaldi et al. .......... 340/172.5

*Primary Examiner*—Raulfe B. Zache
*Attorney*—Greene & Dunn

ABSTRACT: In address-coded signaling, successive, contiguous and equal sections of an information signal at a transmitting station are time-compressed into discrete spaced information packets being time-position modulated in respect to equispaced time intervals in accordance with the address code of a receiving station being called by said transmitting station. An address evaluator cooperating with the received signal packets and the stored address code at the receiving station serves, upon coincidence of the received and stored address codes, to establish synchronism with the transmitting station and the received demodulated signal packets are in turn expanded, to restore the original continuous information signal.

INVENTORS
FRITZ EGGIMANN
GUSTAV GUANELLA
MANFRED TIESNES
BY IVAN WIGDOROVITS
KARL RATH
ATTORNEY

INVENTORS
FRITZ EGGIMANN
GUSTAV GUANELLA
MANFRED TIESNES
BY IVAN WIGDOROVITS
KARL RATH
ATTORNEY

INVENTORS
FRITZ EGGIMANN
GUSTAV GUANELLA
MANFRED TIESNES
BY IVAN WIGDOROVITS
KARL RATH
ATTORNEY

INVENTORS
FRITZ EGGIMANN
GUSTAV GUANELLA
MANFRED TIESNES
BY IVAN WIGDOROVITS
KARL RATH
ATTORNEY

MEANS FOR AND METHOD OF ADDRESS-CODED SIGNALING

The present invention relates to means for and a method of operating an address-coded, wire or radio transmission system.

BACKGROUND OF THE INVENTION

In address-coded signaling systems, it has hitherto been customary to allocate the coded addresses to the information signals or sections of signals so that the address of the required counterstation being called for which a specific signal section is intended, precedes this signal section proper, for example, whereby the entire signal to be transmitted contains additional, "redundant" bits for the address code apart from the useful information. The time needed for the transmission of these bits over a common transmission channel naturally reduces the transmission capacity so that fewer transmitters or receivers can use the same channel than would be possible without separate transmission of the additional address signals.

Accordingly, an important object of the present invention is to overcome this disadvantage and keep the transmission channel free as far as possible for pure information signals only—with simultaneous transmission of the coded addresses.

BRIEF DESCRIPTION OF THE INVENTION

According to the invention, this is achieved in that the information signals are split up into sections of equal duration and are converted at the individual transmitters into time-compressed signal sections or "packets" including the complete information content of the original signal sections so that intervals occur between the signal packets from a specific transmitter, during which intervals the signal packets from other transmitters and possibly also service signals can be transmitted largely without causing mutual interference and without any separate synchronism being needed for this purpose between the various transmitters. In the receivers, the associated signal packets are temporarily stored and demodulated with a view to the information contained therein, after which the information signals corresponding to the individual signal sections are combined in a sequence without any gaps in time, to restore the original signals.

The invention is further characterized by a variable spacing between a plurality of signal packets, in such a manner that these signal packets determine the coded address of the called receiver by their mutual position in time and that each receiver substantially only recognizes and utilizes those signals packets, the position in time of which corresponds to its address. Finally, the invention is characterized by at least one further recognition check of the received address code after the first recognition, after which the called receiver is synchronized with the basic frequency of the signal packets received.

In the system proposed according to the invention, a selective call comes about relatively quickly with monitoring and analysis of the addresses at the receiving end. Furthermore, additional means, described in more detail below, are provided to achieve the synchronism which should be obtained as reliably as possible, even in the event of disturbed transmission.

Taking into consideration the particular advantages and possibilities for realization afforded by the proposed system, certain general requirements, and further objects, as set forth in the following, must be taken into consideration in the practical realization of this method.

The shifts in position of the signal packets should be effected according to a specific time pattern in accordance with the predetermined program. The length of the signal packets should be at least substantially constant, regardless of the intervals, and should not be too great (for example 0.1 msec.). The "compression coefficient" should be sufficiently high (for example 1/100). This leads to a recurrence frequency of the position changing which should not be too low (for example 100/sec.). The callup and synchronization of the desired receiver should be assured as quickly as possible at any time (including after interrupted transmission) and without a special callup phase limited in time. The transmission of an additional address should be dispensed with. The address evaluation and synchronization must take place automatically. After synchronization has been effected, the communication receiver should be locked in the intervals between the signal packets. A special electronic synchronizing pulse source for the rough synchronization should be avoided. Realization of the apparatus of the invention should be possible with integrated circuits.

In some circumstances, the following special measures may be desirable in addition, especially in connection with secret signaling. Additional minor shifts of the signal packets to camouflage the basic period. Avoidance of a periodic address repetition by an additional program having a very long repetition period; for example alternating spacing between individual groups of signal packets or programmed reversal of different groups of signal packets.

BRIEF DESCRIPTION OF THE FIGURES

The invention, both as to the forgoing and ancillary objects as well as novel aspects thereof will be better understood from the following detailed description of a few practical embodiments, taken in conjunction with the accompanying drawings forming part of this disclosure and in which.

Like reference characters denote like parts throughout the different views of the drawings.

DETAILED DESCRIPTION OF THE FIGURES

To begin with, it is assumed that the compressed signal packets are obtained on the basis of the time compression principle, involving the scanning or subdivision of the original signal sections, storing of the scanned sections and readout at an increased speed prior to transmission.

Figure 1:
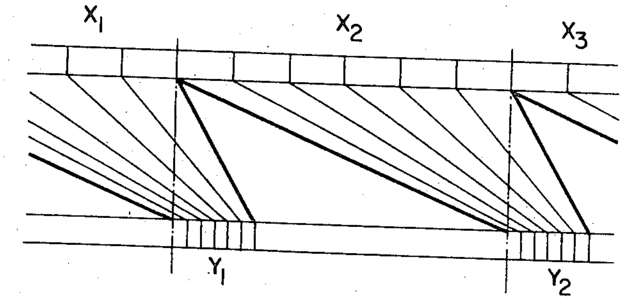
FIG. 1 is a theoretical diagram explanatory of the basic method of signal transmission underlying the invention.
Figure 2:
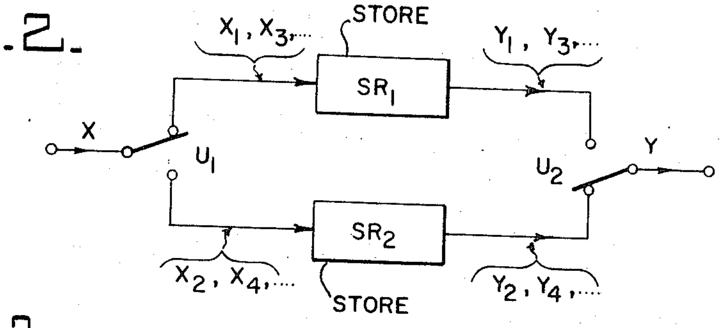
FIG. 2 illustrates, by way of example, a time compression circuit for producing signals according to FIG. 1.
Figure 3:
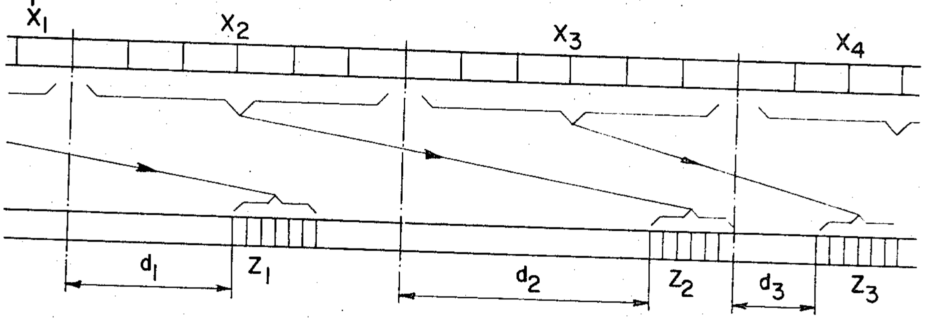
FIG. 3 being a diagram similar to FIG. 1, more clearly illustrates the time-position modulation of the signal of FIG. 1 for address coding purposes.

Thus, referring to FIG. 1, the time compression of the information signal $x$ to be transmitted and being composed of equal contiguous sections $x_1$, $x_2$, .... is effected, for example, by scanning or decomposition into said sections, storage of the latter and accelerated readout, to result in the delayed and shortened or time-compressed signal packets $y_1$, $y_2$, .... containing all the original information of the original sections $x_1$, $x_2$, .... For this purpose, two separate stores $SR_1$ and $SR_2$ may be utilized as shown in FIG. 2, to which are applied alternately and respectively the signal sections $x_1$, $x_3$ ... and $x_2$, $x_4$ ... by way of a first changeover switch $U_1$, and from which stores the applied sections are extracted or read out at an accelerated speed by way of a further changeover switch $U_2$. The resulting time compression factor $k=x/y$ may be of the order of magnitude of 1/100 for example. The time-position modulation of the signal packets $Y_1$, $y_2$, ...., resulting in the variably delayed packets $z_1$, $z_2$, $z_3$ ..., FIG. 3, is achieved through appropriate selection of the staring points of the readouts, or of the delay times $d_1$, $d_2$, $d_3$ ..., respectively. The reconstruction or recovery of the original contiguous signal sections $x_1$, $x_2$, ... at the receiver may be effected by means of corresponding stores and switches as shown by FIG. 2 to which the signals are applied in reverse order, that is, with the received signal packets being applied at relatively high speed or rapid storing and being extracted or read out at relatively reduced speed, respectively.

Other methods may also be used, however, for forming the compressed and expanded signal packets. For example, it has already been proposed that the original signal section may be divided into a plurality of subsections and all the subsections apart from the one normally transmitted last, should be delayed and transposed with regard to their carrier frequency, in such a manner that the entire information is transmitted during the period of a single subsection, and the originally successive time intervals for the subsections are allocated to frequency channels at a sufficient mutual distance over which the simultaneous transmission of the subsection signals is effected. This principle, which may be termed a kind of "combined time-division and frequency-division multiplex transmission" naturally likewise supplies compressed signal packets (multicarrier pulses), the time position of which can be modulated by the method proposed according to the invention for transmission of an address code.

Figure 4:
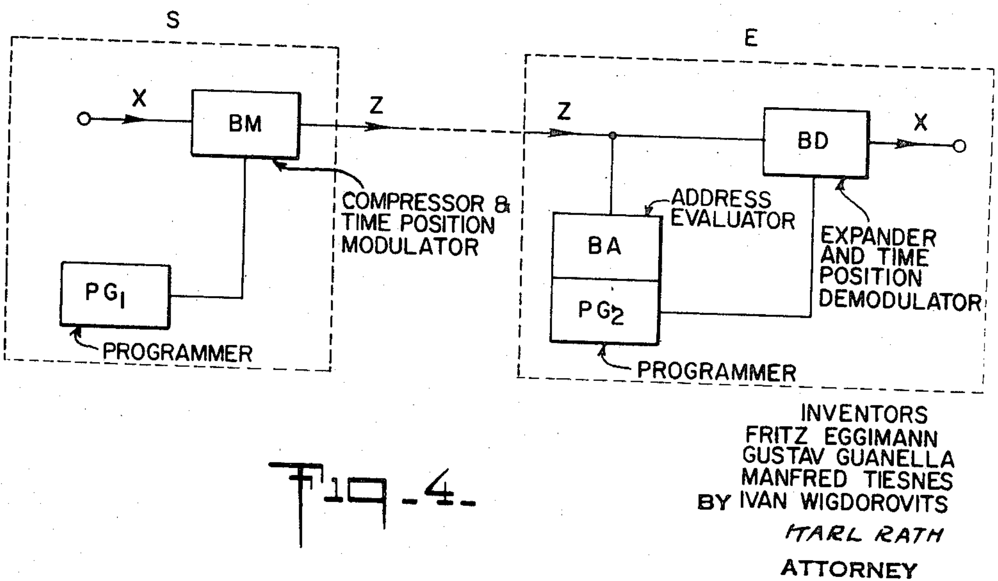
FIG. 4 is a simplified block diagram of a complete signal transmission and receiving system constructed in accordance with the principles of the invention.

Regardless of the method of obtaining the compressed signal packets, the time position modulation system for these signal packets corresponds in general form to a diagram as shown in FIG. 4, with the time compressor and position modulator BM at the transmitting end S, the time expander and position demodulator BD at the receiving end E, and the program or code transmitters $PG_1$ and $PG_2$. The address evaluator BA is provided for the address recognition and synchronization.

Figure 5:
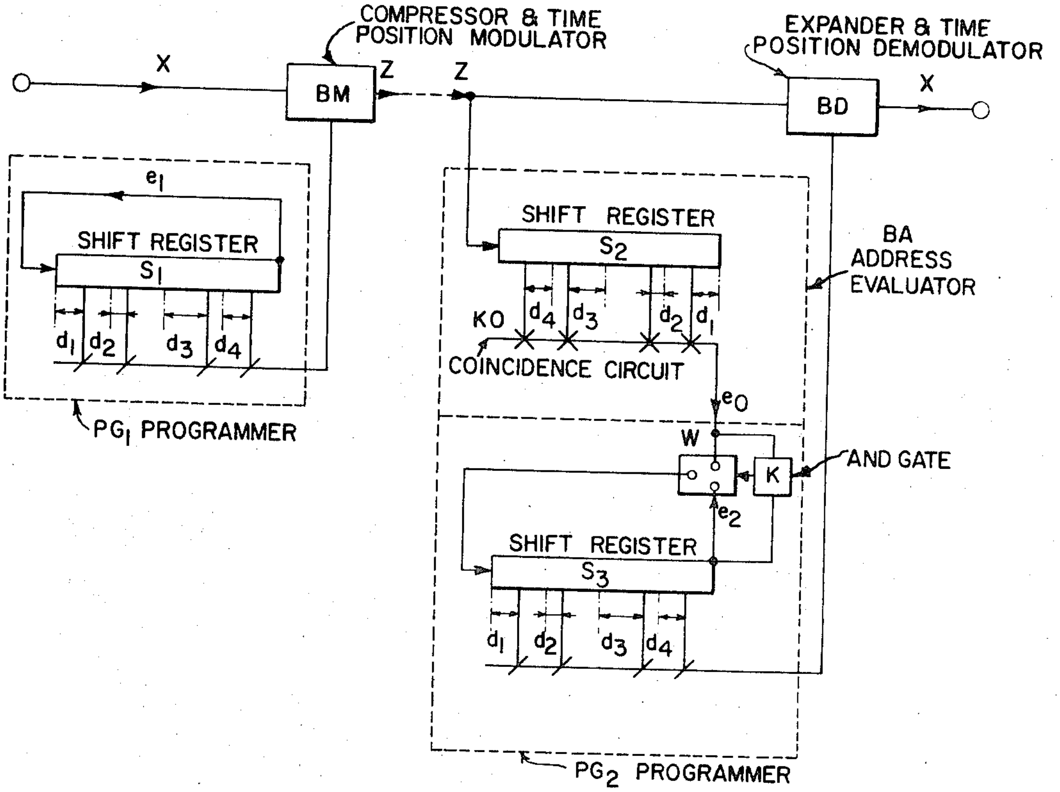
FIG. 5 is a more detailed block diagram of a signal transmission system according to the invention, utilizing time-compression and expanding devices of the type according to FIG. 2.

In order to permit easy address recognition, it is advisable to combine a plurality of signal packets into groups with a constant group program forming the address corresponding that is to say constant distribution within each group. Such a program may be produced, for example by the programmer $PG_1$ as shown in FIG. 5 which consists of a feedback shift register $S_1$ with selective tapping. A guide pulse travelling periodically through the register produces output pulses which are displaced in time by the amounts $d_1$, $d_2$ ... in relation to equidistant time positions. The program signal thus obtained controls the time position modulator BM, the output signals $z$ from which have the same displacements in time. A corresponding program signal (programmer $PG_2$) controls the time position demodulator BD for the signal packets at the receiving end, in order to recover the original signals $x$.

Figure 5A:
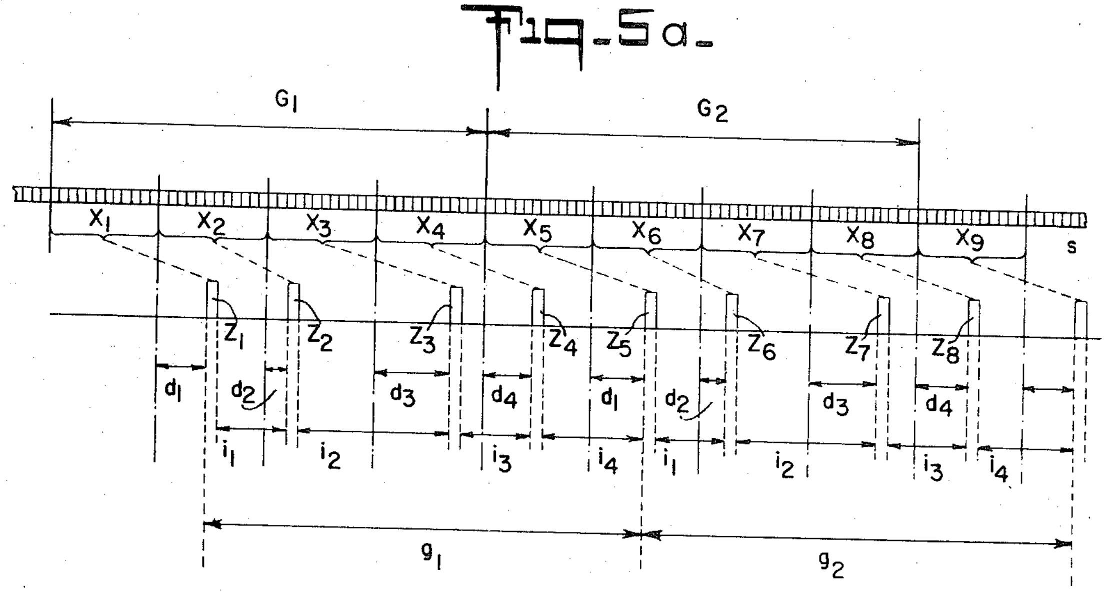
FIG. 5*a* is a further signal diagram explanatory of the function and operation of FIG. 5.

FIG. 5a more clearly shows the original groups $G_1$, $G_2$ ... of contiguous signal sections $x_1$ - $x_2$ - $x_3$ - $x_4$, $x_5$ - $x_6$ - $x_7$ - $x_8$... being converted into groups $g_1g_2$. ... of time compressed and spaced signal packets $z_1$ - $z_2$ - $z_3$ - $z_4$, $z_5$ - $z_6$ - $z_7$ - $z_8$, ... having varying time delays $d_1$, $d_2$, $d_3$, $d_4$, in respect to fixed equidistant time positions of predetermined repetition frequency, and representing the program or address code of the receiving station E being called by a transmitting station S. In other words, the address code is represented by time position modulation of the compressed signal packets derived from the original continuous transmitting signal. In FIG. 5a the varying spacing intervals between the compressed signal packets $z_1$- $z_2$- $z_3$- $z_4$ ... are further denoted by $i_1$, $i_2$, $i_3$, $i_4$, respectively.

The address evaluator BA serves for the address recognition and synchronization of the programmer $PG_2$ at the receiving end and consists of a shift register $S_2$ which is supplied with the pulses formed from the shortened signal packets. If the tappings are adjusted according to the programmed displacements $d_1$, $d_2$, ... , that is to say with correct selection of the address, an output pulse initiated by the group of signal packets appears in the coincidence circuit each time and at first releases a guide pulse for producing the next program pulse group, through the switch W. As soon as coincidence between the following coincidence pulse $e_0$ and the guide pulse $e_2$ is established in AND-circuit K after a few repeated operations, W is switched over and the program transmitter continues to run autonomously regardless of accidental disturbances in transmission.

The number $n$ of possible addresses depends on the compression factor $k$ and on the number $m$ of signal packets per group, i.e., $$n=1/k^m$$

As can easily be seen, even short addresses (for example $m=4$) lead to a great number of possible addresses with the shortening in question (for example $k=1/100$)—for example $n=100^4=10^8$. Certain restrictions are necessary, however, in order to recognize the beginning of the address and to avoid confusion although this can easily be recognized by automatic checking.

A considerable reduction in expense (although with simultaneous reduction in the number of addresses) is obtained by using shift registers in which only individual groups in all stages have taps. By interconnecting 10 such groups for example, each with 10 taps and nine registers without taps, $10^{10}$ possible addresses are already obtained, for example.

Figure 6:
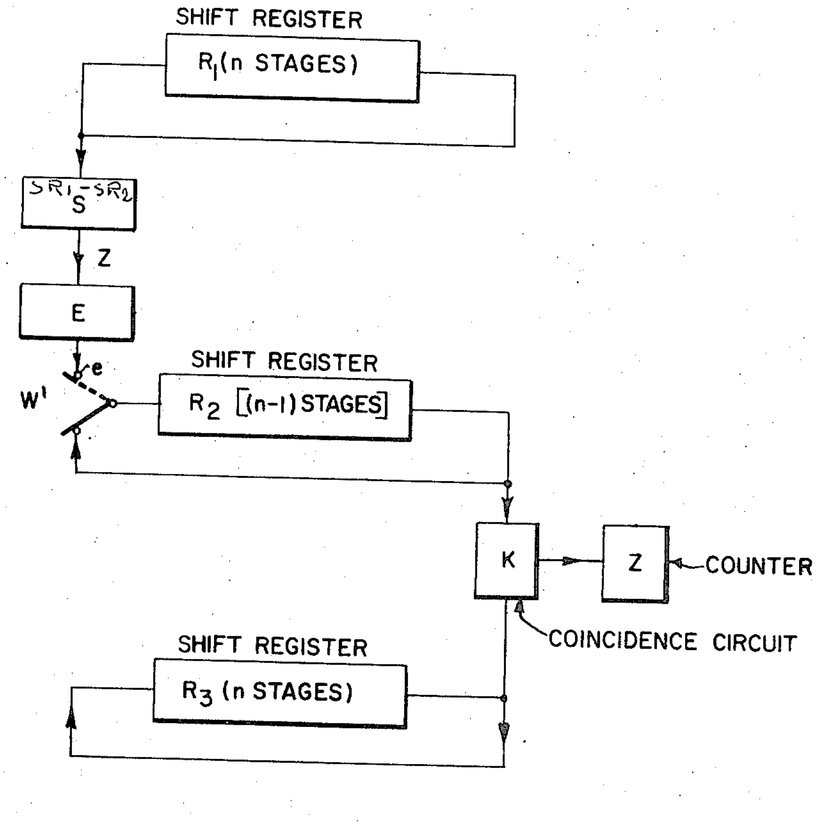
FIG. 6 is a basic block diagram illustrating an alternative way of carrying into effect the invention.

A further considerable reduction in expense without simultaneous reduction in addresses is obtained by an arrangement shown in FIG. 6 by the use of feedback shift registers without taps. The addresses are stored by means of a generally irregular sequence of pulses, each in one of $n$-stage shift registers $R_1$ in the transmitter S. In operation, the contents of this shift shift register circulate continuously at the frequency $f_1$, and pulses appearing at the end of the register cause the extraction of the next signal packet from the appropriate store $SR_1$ or $SR_2$, FIG. 2. The addresses are stored in feedback shift registers $R_2$ of like construction and without taps (address evaluation registers) in the receiver E. The address recognition of reference register $R_3$ does not have any taps either in this case and is likewise fed back like registers $R_1$ and $R_2$.

More particularly, pulses $e$ each corresponding to the pulse packet received, are written in the $(n-1)$- stage address-evaluation register $R_2$, through the input switch 2. Between two writing pulses, the entire contents of the register circulate at least once with a correspondingly higher frequency $f_2=n\cdot f_1$. Thus, the switch w' is in the position shown in solid line fashion during each circulation and is brought only briefly into the position shown in broken lines after each circulation, the particular pulse which has been stored longest being replaced by a fresh input pulse (binary "1 " or "0 " depending on the address code).

The pulses thus appearing at the output of this register are each compared, in the comparator K, with the pulses at the output of the $n$-stage address-recognition or reference register $R_3$. In this feedback register, the address offered for comparison circulates in the form of a code word, the individual bits of which appear in rapid sequence (likewise at a frequency $n\cdot f_1$) at the end of the register, and are supplied to the second input of the comparator K, the first input of which receives the code bits from $R_2$ arriving in synchronism. An address generator, operated at a correspondingly higher frequency, (for example in accordance with FIG. 8, described further on) may be used instead of the address recognition register $R_3$.

The comparator K may be a known switching circuit for realizing a logical equivalence condition. Thus, its output is a binary "one" when both inputs receive a "1 " bit or both inputs receive a "0 " bit, whereas this output corresponds to a binary "zero" when both inputs are "antivalent," that is to say one of them receives a "1 " bit, but the other receives a "0 " bit. If, after a number of "rapid cycles" of the evaluator register $R_2$, at the end of which the particular bit which has been stored longest is replaced by a fresh bit from the register $R_1$, the address code word circulating in the register $R_2$ finally coincides, bit by bit, with the reference address which is circulating in the register $R_3$ (or supplied to the comparator at a corresponding frequency $n \cdot f_1$ from another address generator), then an uninterrupted sequence of "1" bits, the number of which corresponds to the "word length" of the address code word, appears at the output of K during one cycle of the registers $R_2$ and $R_3$ running synchronously. These "1" bits are supplied as short pulses to the counter Z which is preset to the code word length and reset to zero after each circulation cycle. In the case under consideration of coincidence between the two codes, Z would thus reach the present count and deliver a corresponding address recognition signal to the receiver E.

So long as the local and received addresses do not coincide, however, at least some of the bits supplied in pairs to the comparator K are "antivalent," so that a sufficient number of "1" bits is not obtained during one cycle to reach the preset count. Thus, in this case an address recognition signal cannot be delivered under any circumstances.

An $n$-stage register may be used instead of a $(n-1)$-stage receiving register $R_2$, in which case care must be taken to ensure that the necessary phase relationship is adhered to by an appropriate operating frequency control.

In addition, the shift registers R (also with regard to the construction first described with taps) may be replaced by suitable delay lines of other types, wherein a coded pulse train travels from the beginning to the end of the line during a defined transmission time and is returned to the beginning (dynamic recirculation store).

It would also be conceivable, however, to store the addresses in static registers $R_1$, $R_2$, $R_3$ (for example magnetic-core registers), to convert the addresses from $R_1$ into serial information for the pulse position modulation of the shortened signal packets by means of a pulse distributor, to store the pulse train $e$ in $R_2$ at the receiving end by means of pulse distributors and then to compare it (again by means of K and Z) with reference address stored in $R_3$ (or delivered by an address generator at a correspondingly rapid sequence, frequency $n \cdot f_1$).

By operating with two or more short addresses, the sequence of which follows a specific program, a program with a considerably extended basic cycle is obtained. In this manner, secrecy transmission may be effected by practically preventing reception by unauthorized receivers. According to FIG. 7 for example, two alternating programs are obtained from the shift register $S_1$ groups by means of the changeover switch $V_1$. Corresponding groups are also provided in the address interpreter and programmer at the receiving end. In picking up the received signals, the master pulses from the programmer at the receiving end are derived directly from the coincidence interpreter A and only after synchronism has been achieved is there a switchover to autonomous program production by the receiver. The control of the changeover switch W is again effected by comparison of the start pulses obtained through address interpretation with the local master pulses in the AND-circuit K.

Operation with partial programs is advisable, the cycles of which differ somewhat from one another. In the programmer $PG_1$ in FIG. 7, therefore, provision is made for selective extraction of the feedback pulse through the changeover switch $U_1$. A corresponding changeover switch $U_2$ controlled in the same manner is, of course, necessary in the programmer $PG_2$ at the receiving end.

Figure 7:
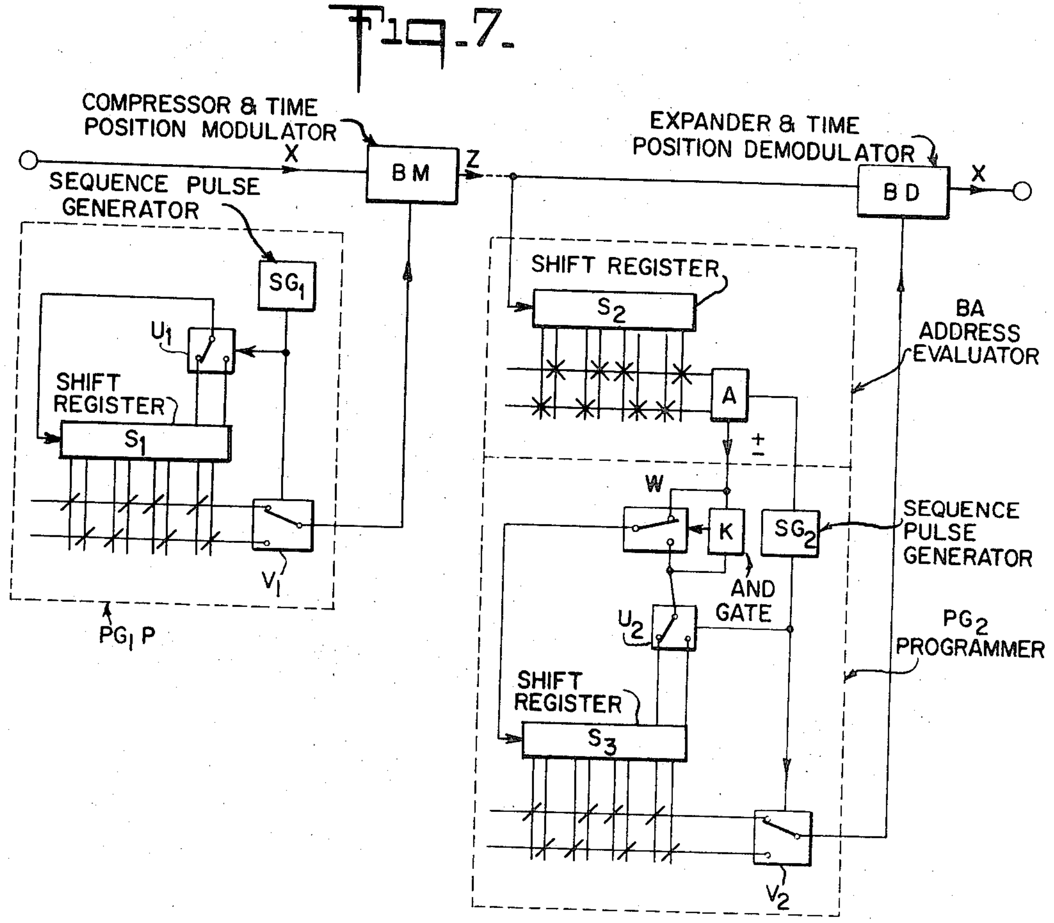
FIG. 7 being a block diagram similar to FIG. 5, illustrates an improvement of the latter or improving the secrecy of the transmission.
Figure 8:
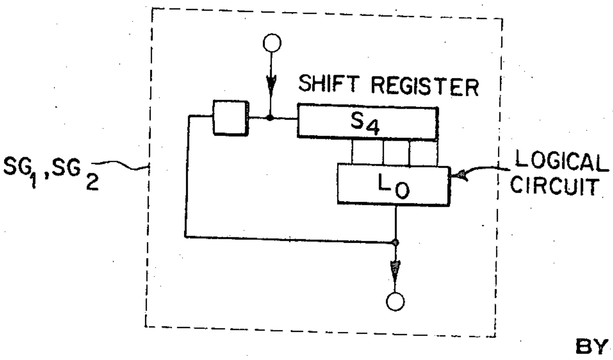
FIG. 8 is a partial block diagram more clearly showing the construction of one of the constituent parts of FIG. 7.

The signal for controlling the additional position modulation or switching over the short addresses may appropriately be obtained by means of a random sequence pulse generator having a long repetition cycle ($SG_1$ and $SG_2$ in FIG. 7). This auxiliary pulse generator may, as shown in FIG. 8, consist of a shift register $S_4$ with feedback through logic circuits LO. The cycle of the auxiliary pulse train which can be obtained amounts to $2^s-1$ (*s= number of stages in the register). For the synchronization, the register $SG_2$* is controlled by the coincidence signals from the address interpreter when starting operations. When synchronism has been achieved, there is a switchover to autonomous operation.

The synchronizing time of the sequence generator covers the length of a plurality of addresses. In order to permit reception, even though subject to disturbance, before the expiration of this synchronization, two signal-packet time-position demodulators may be provided, if necessary, which work in parallel and are each controlled by a pulse train from the program transmitter at the receiving end. Since the output signals from the sequence generators $SG_1$, $SG_2$ should coincide, whereas the synchronizing input signal from $SG_2$ is delayed by the length of one address because of the interposed address interpretation, it is advisable to divide the register $S_4$ in the sequence generator shown in FIG. 8 in order to obtain an output signal leading by one interval in the synchronized stated.

As in devices as shown in FIG. 7, the signals from the same or additional sequence generators may also serve for the additional position control of the transmitted signals or finally for the control of an additional coding apparatus.

In the foregoing, the invention has been described in reference to a few exemplary transmission systems or embodiments. It will be evident, however, that variations and modifications, as well as the substitution of equivalent elements or devices for those shown for illustration, may be made without departing from the broader spirit and purview of the invention.

We claim:

1. A method of address-coded signaling comprising the steps of subdividing the information signal at the transmitter into contiguous signal sections of equal duration, converting said signal sections into short signal packets with the complete information content of the original information signal, whereby intervals occur between said signal packets, time-position modulating recurrent groups of said signal packets in accordance with the coded address of a receiver to be called, comparing a received address derived from said signal packets with a locally stored address code at the receiver, to synchronize the receiver with the transmitter upon coincidence of the received and locally stored address codes, and expanding the received signal packets to restore the original information signal.

2. An address-coded signaling system comprising in combination:

1. A transmitting station and a receiving station connected through a communication link,
2. first means at said transmitting station to divide an information signal to be transmitted into contiguous signal sections of equal duration and to convert said signal sections into delayed time-compressed spaced signal packets containing the complete information of the original signal,
3. second means to time-position modulate recurrent groups of said signal packets according to the address code of said receiving station to be called,
4. address code storage means at said receiving station,
5. receiving and comparison means at said receiving station, to compare the address code derived from the received signal packets with the address code of said storage means,
6. third means associated with said comparison means to synchronize said transmitting station with said receiving station upon coincidence of the received and stored address codes, and
7. means at said receiving station to expand the received signal packets, to restore the original information signal.

3. A signaling system as claimed in claim 2, wherein, in order to realize time compression of the information signal composed of signal sections ($x_1, x_2$ ...), said first means is comprised of first and second separate shift registers ($SR_1$, $SR_2$) first changeover switch means for receiving the information signal and alternately applying the signal sections in alternating sequence through said first changeover switch means ($U_1$), output means, and second changeover switch means for alternately coupling the outputs of said registers to said output means whereby the contents of said registers are read out at accelerated speed through said second changeover switch means ($U_2$) for transmission to the receiving station.

4. A signaling system as claimed in claim 3, further comprising means coupled to said registers for controlling the time delay between the beginning of a signal section and the beginning of a signal packet within said signal section wherein time-position modulation of the signal packets ($z_1$, $z_2$, ....) is achieved by a corresponding selection of the starting points of the accelerated readouts (delay times $d_1$, $d_2$, ....) of the signal packets from said shift registers.

5. A signaling system as claimed in claim 3, wherein the recovery of the original signal sections at the receiver is effected by said expander means which is further comprised of first and second shift registers and first and second changeover switch means of the same type as provided at the transmitter, and wherein the received signals are alternately applied to and read out from said registers by said first and second changeover switch means, respectively, in accordance with the same program as at the transmitter and with relatively rapid read-in and relatively slow readout respectively, whereby said receiver read-in rate is equivalent to the readout rate of said transmitter and said receiver readout rate is equivalent to the read-in rate of the transmitter.

6. A signaling system as claimed in claim 1, wherein said first means further comprises delay control means including means for combining a plurality of signal packets into groups with constant time-position modulation of said packets within each group, to permit easy address recognition at the receiver.

7. A signaling system as claimed in claim 6, wherein said delay control means includes a programmer serving to produce the group modulation and which is comprised of a shift register ($S_1$) with selective tappings, means coupled to said shift register to cause a timing pulse passing periodically through said register to produce output pulses displaced in time by specific intervals ($d_1$, $d_2$ ...) in respect to equidistant normal time positions, said transmitter having a modulator (BM) means coupled to said register tappings to cause the program signal thus obtained to control said modulator (BM) for said signal packets of the transmitter, receiving and comparison means having a demodulator (BD), and further means at said receiver to cause a corresponding program signal to control said demodulator (BD) at the receiver, to recover the original information signals.

8. A signaling system as claimed in claim 6, further including an address evaluator (BA) at said receiver in the form of a shift register ($S_2$) with adjustable tappings, to which are applied the signal packets; a second programmer ($PG_2$) at said receiver; said receiving and comparison means including means for comparing the time occurrences of the output of said second programmer and said address evaluator and which serves for the address recognition corresponding to the programmer at the transmitter.

9. A signaling system as claimed in claim 8, further including a coincidence circuit and a switch (W) each coupled to the taps of the address evaluator (BA) which are set according to the program displacements ($d_1$, $d_2$ ...) to deliver an output pulse ($e_0$) released by a signal packet group from said address evaluator for initiating a timing pulse ($e_2$) which produces the next program pulse group of the second programmer ($PG_2$) at the receiver via switch (W), said switch connecting, in its first position, the output of said coincidence circuit to the input of the programmer shift register ($S_3$) at the receiver and said switch connecting, in its second position, the output to the input of said last register, and to AND-circuit (K), whereby, as soon as coincidence between the next coincidence pulse ($e_o$) and the timing pulse ($e_2$) has been established by said AND circuit, said switch is operated by said AND circuit into this second (feedback) position of the programmer shift register ($S_3$) and the programmer ($PG_2$) continues to run independently regardless of accidental disturbances of the transmission.

10. A signaling system as claimed in claim 2, further comprising a sequence generator coupled to said first means for providing an additional time-position modulation program which is superimposed upon the basic program of the signal packet time-position modulation, the repetition frequency of said additional program being less than the repetition frequency of said basic program.

11. A signaling system as claimed in claim 10, wherein said sequence generator includes means for generating a plurality of short addresses the sequence of which is controlled in accordance with the additional program.

12. A signaling system as claimed in claim 11, wherein said receiver is provided with a sequence pulse generator identical to that provided at the transmitter, said receiver sequence generator being coupled to said second programmer and responsive to said address evaluator to alter the sequence in accordance with the manner of alteration provided at the transmitter station.

* * * * *